Sept. 14, 1926.

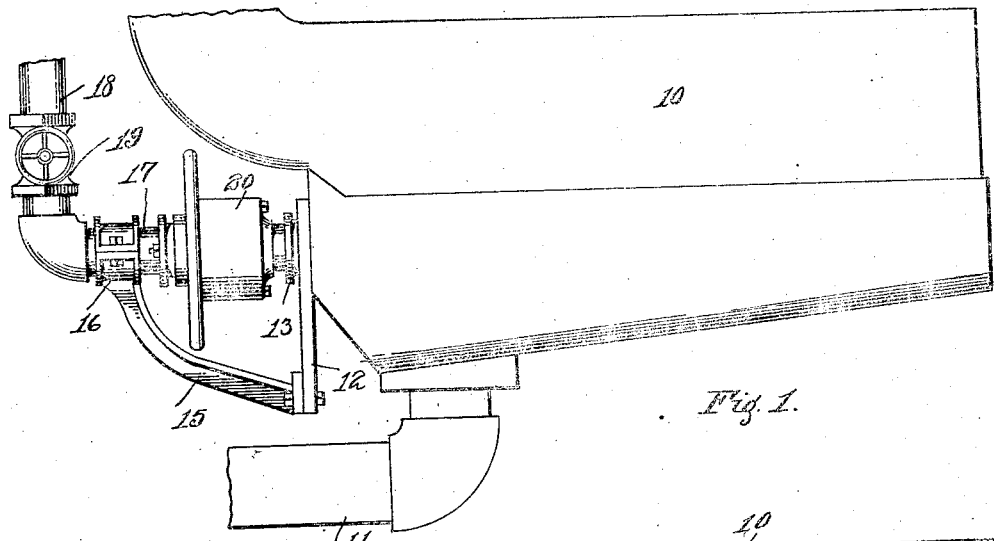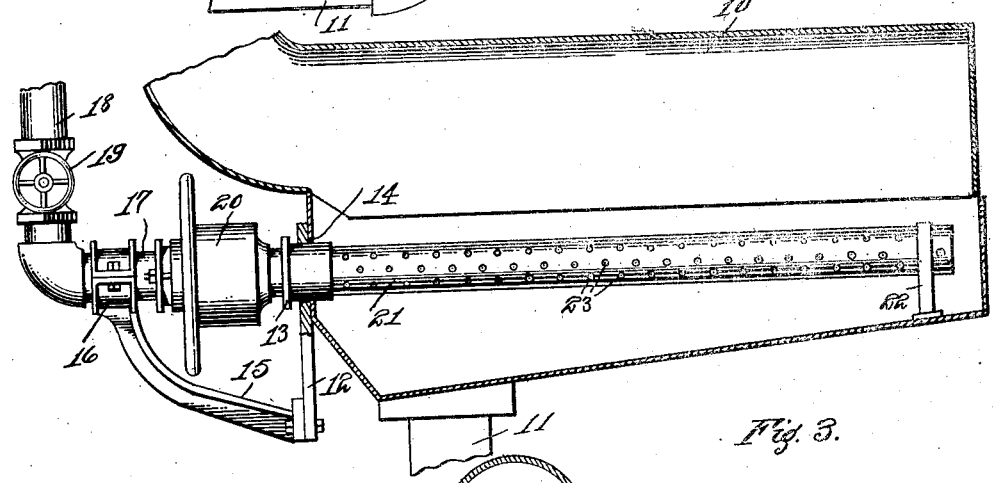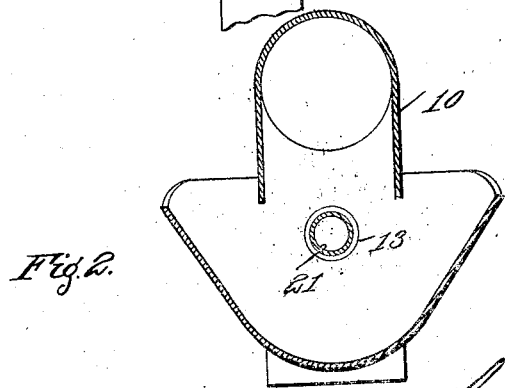

N. CAPAY

STERILIZING DEVICE

Filed August 8, 1924    2 Sheets-Sheet 2

1,600,093

Inventor
Norberto Capay

By
Attorney

Patented Sept. 14, 1926.

1,600,093

UNITED STATES PATENT OFFICE.

NORBERTO CAPAY, OF MANILA, PHILIPPINE ISLANDS.

STERILIZING DEVICE.

Application filed August 8, 1924. Serial No. 730,954.

This invention relates to new and useful improvements in sugar mills, and particularly to devices for sterilizing the juice troughs.

When the sugar mill is stopped for a period of time, as for instance, over night, a scum, containing bacteria collects on the walls of the juice troughs, causing fermentation which will destroy or greatly retard the effects of the following steps in the process of treating the juices, should fresh juices be permitted to flow into the troughs. It is customary to scrape off this collection before the fresh juices are permitted to flow into the troughs from the cane squeezing rolls. Sometimes steam is injected into the troughs through the medium of a hose, but this is dangerous to the operator, as the hose becomes very hot, and the steam often burns the operator. It is with these objectionable features in view that the present device has been made.

The principal object of the invention is to provide means for sterilizing the juice troughs, by means of steam, so that the operation can be performed without danger to the operator, as well as to more perfectly cleanse the troughs with the result that the character of the resultant product is greatly improved.

A further object is to provide a novel means for injecting the steam into the troughs so that all parts of the walls thereof will be attacked by the steam.

Other objects and advantages will be apparent from the following description when taken in connection with the accompanying drawings.

In the drawings:—

Figure 1 is an elevation of a juice trough showing the invention applied thereto.

Figure 2 is a vertical transverse sectional view therethrough.

Figure 3 is a vertical longitudinal central sectional view.

Figure 4:
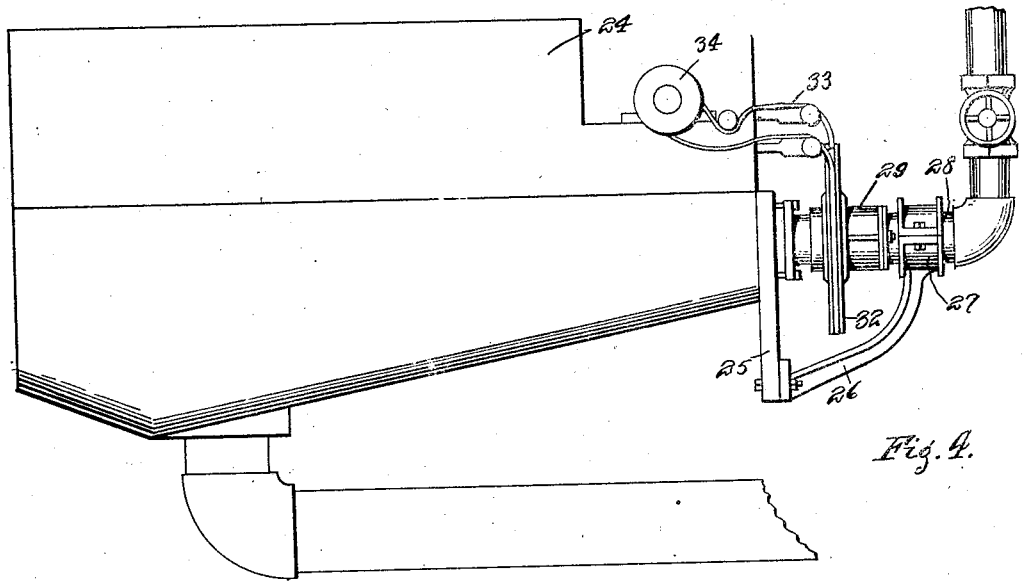
Figure 4 is an elevation of a modification of the device.

Referring particularly to the accompanying drawings, and especially to Figures 1, 2, and 3, 10 represents the juice trough which receives the juices squeezed from the cane by rollers (not shown), arranged thereabove, an outlet pipe 11 being connected to the bottom of the lower end of the trough for carrying off the juices to suitable receptacles, not shown. Mounted on the vertical wall of the lower end of the trough is a depending plate 12, and fitted in an opening in this plate is an apertured boss 13, which projects through an opening 14 in the end of the trough. Secured to the lower end of this plate 12, and curving upwardly and outwardly therefrom, is an arm 15, the upper end of which is formed with a separable bearing box 16, in which is supported the pipe 17. Connected to this pipe, at the outer end thereof, is a steam conduit 18, which leads to a source of steam supply, and in this pipe is a control valve 19. Mounted on the inner end of the pipe 17 is a steam turbine 20, of suitable size and design, and connected with the other side of the turbine is a pipe 21, which extends through the before-mentioned boss 13, and longitudinally within the trough 10, the other end of the pipe being rotatably supported in the bearing 22 mounted on the bottom of the trough. Throughout the length of the pipe 21 are steam outlet openings 23, from which issues the steam for the purpose of cleansing the walls and bottom of the trough.

Steam is introduced into the pipe 17, and flows into the pipe 21, to finally issue from the openings 23 against the walls of the trough. The steam which enters the pipe 17 causes the turbine to rotate, with the result that the pipe 21 is rotated, the steam which exhausts from the turbine escaping through the openings 23 against the walls of the trough. It will thus be seen that as the pipe 21 rotates, the steam which is constantly issuing from the openings 23, will attack every portion of the walls of the trough, with the result that the trough will be perfectly sterilized and ready for use again. Furthermore, this obviates the usual laborious and dangerous methods now practiced. It will, of course, be understood that the condensed steam, and the detached scum or collection removed from the walls of the trough, escape through the outlet pipe 11.

Figure 5:
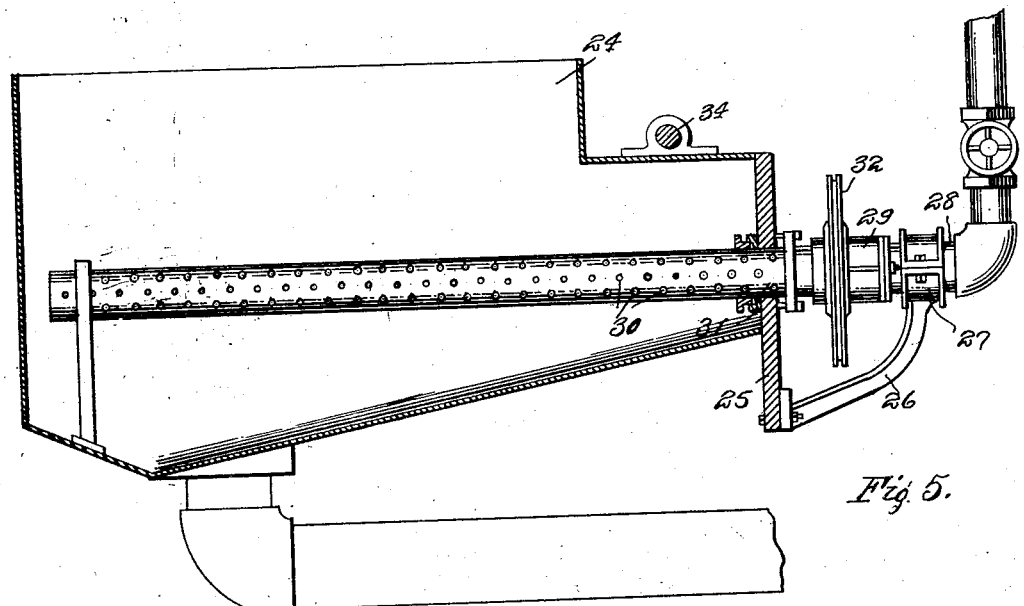
Figure 5 is a vertical longitudinal central sectional view through the modification.

Referring particularly to Figures 4 and 5, 24 represents the juice trough which has the plate 25 secured to one end, and on the lower end of said plate there is secured the bracket arm 26, similar to the arm 15, and having the terminal bearing 27 for supporting the pipe 28, which conducts the exhaust steam from the mill engines to the trough.

A suitable packing gland 29 is mounted on the adjacent end of the pipe 28, and connected in this gland is one end of a perforated pipe 30 which extends through the apertured boss 31, formed in the plate 25, and longitudinally within the trough 24, where its other end is rotatably supported in a bracket carried by the bottom of the trough. On the outer end of the pipe 30 there is secured a pulley 32, which is driven by means of the belt 33, from the conveyor 34.

While I have shown two methods of rotating the steam pipe within the trough, I do not wish to be confined to either form, as I may use either, or both, or some other method equally as effective. The principal feature of the present invention resides in the provision of a perforated pipe located within a juice trough in position to receive steam from any suitable source, and to project the steam against the walls of the trough, when the pipe is rotated, thus more thoroughly cleansing the trough than with devices used heretofore.

What is claimed is:—

1. The combination with the juice trough of a sugar mill, of a bracket mounted exteriorly of the trough, a bracket mounted interiorly of the trough, a rotatable perforated steam pipe supported at its ends in said brackets, and a steam motor for rotating said pipe and discharging steam thereinto.

2. The combination with the juice trough of a sugar mill, of a perforated pipe disposed longitudinally within the trough and having one end extending therefrom, and a steam operated motor operatively connected with the pipe for rotating the latter and arranged to discharge its exhaust steam into said pipe.

In testimony whereof, I affix my signature.

NORBERTO CAPAY.